US012599143B2

(12) United States Patent (10) Patent No.: US 12,599,143 B2
Hamamoto et al. (45) Date of Patent: Apr. 14, 2026

(54) EMULSIFIED OIL AND FAT COMPOSITION

(71) Applicant: MIYOSHI OIL & FAT CO., LTD.,
Tokyo (JP)

(72) Inventors: Kazuhiro Hamamoto, Tokyo (JP);
Kimiko Saito, Tokyo (JP); Baku
Ushijima, Tokyo (JP); Akira Ohta,
Tokyo (JP)

(73) Assignee: MIYOSHI OIL & FAT CO., LTD.,
Tokyo (JP)

( * ) Notice: Subject to any disclaimer, the term of this
patent is extended or adjusted under 35
U.S.C. 154(b) by 506 days.

(21) Appl. No.: 17/904,828

(22) PCT Filed: Feb. 24, 2021

(86) PCT No.: PCT/JP2021/006920
§ 371 (c)(1),
(2) Date: Aug. 23, 2022

(87) PCT Pub. No.: WO2021/177115
PCT Pub. Date: Sep. 10, 2021

(65) Prior Publication Data
US 2023/0157305 A1 May 25, 2023

(30) Foreign Application Priority Data
Mar. 2, 2020 (JP) ................................. 2020-035264

(51) Int. Cl.
*A21D 2/16* (2006.01)
*A23D 7/005* (2006.01)
*A23L 7/104* (2016.01)

(52) U.S. Cl.
CPC ............... *A21D 2/16* (2013.01); *A23D 7/005*
(2013.01); *A23L 7/104* (2016.08)

(58) Field of Classification Search
CPC ........... A21D 2/16; A21D 7/104; A23L 7/104;
A23D 7/005
See application file for complete search history.

(56) References Cited

U.S. PATENT DOCUMENTS

2011/0151101 A1* 6/2011 Iwamoto ................... C11C 3/04
426/601

FOREIGN PATENT DOCUMENTS

| EP | 0233565 A2 | 8/1987 |
|---|---|---|
| JP | S62-220147 A | 9/1987 |
| JP | S62-232334 A | 10/1987 |
| JP | S63-248341 A | 10/1988 |
| JP | S64-010944 A | 1/1989 |
| JP | H04-038284 U | 3/1992 |
| JP | H11-276069 A | 10/1999 |
| JP | 2011-109960 A | 6/2011 |
| JP | 5893265 B2 * | 3/2016 |
| JP | 2016-168000 A | 9/2016 |
| JP | 2016-168002 A | 9/2016 |
| JP | 2016-168003 A | 9/2016 |
| JP | 2017-131176 A | 8/2017 |

OTHER PUBLICATIONS

"About Koji and Koji Amazake". Available online at https://www.
uonuma-jozo.co.jp/en/koji/index.html#:~:text=While%20Uonuma%
20Jozo%20makes%20amazake,of%20this%20amazake%20is%
20different. on Sep. 25, 20219 (Year: 2019).*

* cited by examiner

*Primary Examiner* — Erik Kashnikow
*Assistant Examiner* — Assaf Zilbering
(74) *Attorney, Agent, or Firm* — Knobbe, Martens, Olson
& Bear, LLP

(57) ABSTRACT
An emulsified oil and fat composition having a refreshing
flavor and sweetness. The emulsified oil and fat composition
contains a Koji fermentation product in which the pH value
of the aqueous phase is 3.1-6.0 inclusive. The Koji fermen-
tation product may be a Koji fermentation product of rice.

16 Claims, No Drawings

EMULSIFIED OIL AND FAT COMPOSITION

This application is the U.S. National Phase under 35 U.S.C. § 371 of International Application PCT/JP2021/006920, filed Feb. 24, 2021, designating the U.S., and published in Japanese as WO 2021/177115 on Sep. 10, 2021, which claims priority to Japanese Patent Application No. 2020-035264, filed Mar. 2, 2020, the entire contents of which are incorporated herein by reference.

TECHNICAL FIELD

The present invention relates to an emulsified oil and oil and fat composition.

BACKGROUND ART

In recent years, emulsified oil and fat compositions such as margarine are actually substituted for butter due to the shortage of raw materials of butter and other reasons. However, such emulsified oil and fat compositions, which do not usually include animal-origin raw materials (dairy ingredients and the like), are known to be likely to have inferior flavor.

Accordingly, various flavor enhancers having no animal-origin raw materials have been proposed. For example, Patent Document 1 proposes a milk flavor enhancer including a plant-origin extract and saccharides.

Patent Document 1: Japanese Unexamined Patent Application, Publication No. 2017-131176

DISCLOSURE OF THE INVENTION

Problems to be Solved by the Invention

Nonetheless, there are still needs for flavor enhancers capable of achieving flavors (refreshingness, sweetness, and others) similar to those from animal-origin raw materials.

The present invention is made in view of the above. An object of the present invention is to provide an emulsified oil and fat composition having refreshingness and sweetness.

Means for Solving the Problems

The present inventors have found that an emulsified oil and fat composition including a Koji fermentation product and having an aqueous phase at a pH in a predetermined range can solve the above problems. Then the present invention has been completed. More specifically, the present invention can provide the followings.

(1) An emulsified oil and fat composition including a Koji fermentation product and having an aqueous phase at a pH of 3.1 or more and 6.0 or less.

(2) The emulsified oil and fat composition as described in (1), in which the Koji fermentation product is a Koji fermentation product of rice.

(3) The emulsified oil and fat composition as described in (1) or (2), in which the aqueous phase includes a fruit juice.

(4) The emulsified oil and fat composition as described in any one of (1) to (3), in which the emulsified oil and fat composition has an oil phase including a transesterified oil and fat between a palm-based oil and fat and a laurate-based oil and fat.

(5) The emulsified oil and fat composition as described in any one of (1) to (4), in which the aqueous phase has a Brix value of 2 or more and 40 or less.

(6) The emulsified oil and fat composition as described in any one of (1) to (5), in which the emulsified oil and fat composition is a water-in-oil emulsified oil and fat composition.

Effects of the Invention

The present invention can provide an emulsified oil and fat composition having refreshingness and sweetness.

PREFERRED MODE FOR CARRYING OUT THE INVENTION

The embodiments of the present invention are described below, but the present invention shall not be limited to those embodiments.

<Emulsified Oil and Fat Composition>

The emulsified oil and fat composition according the present invention satisfies all of the following requirements.

(1) The emulsified oil and fat composition according the present invention includes a Koji fermentation product.

(2) The emulsified oil and fat composition according the present invention has an aqueous phase at a pH of 3.1 or more and 6.0 or less.

Koji fermentation products are traditionally blended with various foods and drinks, and known to have unique flavors, umami taste, and others. Nonetheless, the present inventors surprisingly find that when an emulsified oil and fat composition includes a Koji fermentation product, and the aqueous phase is adjusted so as to have a pH of 3.1 or more and 6.0 or less, refreshingness can be conferred without impairing those flavors (sweetness and the like) of the Koji fermentation product, leading to enhancement of both refreshingness and sweetness. Even in the case where an emulsified oil and fat composition includes a Koji fermentation product, when the pH of the aqueous phase was outside of the above range, either one of refreshingness or sweetness could not be enhanced, or neither refreshingness nor sweetness could be enhanced.

The term "refreshingness" as used in the present invention means good refreshing aftertaste. Usually, a Koji fermentation product alone cannot create such a flavor.

The term "sweetness" as used in the present invention means sugar-like sweetness, and refers to a flavor mainly originating from a Koji fermentation product. Flavors originating from a Koji fermentation product which can be achieved according to the present invention also include "richness".

Below, the embodiments of the emulsified oil and fat composition according to the present invention are described in detail.

(Koji Fermentation Product)

The term "Koji fermentation product" as used in the present invention refers to an edible fermentation product which can be obtained with Koji.

The term "Koji" as used in the present invention refers to grain and the like (rice, wheat, soybean, bran, rice bran, and the like) on which *Aspergillus* (typically *Aspergillus* P. Micheli ex Link) is grown.

Target materials for fermentation from which Koji fermentation products are produced include rice, rice bran, wheat, soybean, and the like. Among these, rice is preferred (in other words, the Koji fermentation product used in the present invention is preferably a Koji fermentation product of rice) from the point of view that the effects of the present invention can be easily achieved.

There is no particular limitation for a method of manufacturing the Koji fermentation product, and conventionally known fermentation methods can be adopted depending on target materials for fermentation and the like. The fermentation product may be a solid material from which juice sap is filtered off, or may be a mixture of juice sap and solid matter. Further, these may be concentrated or dried and powdered.

Koji fermentation products include Koji Amazake, Sake lees, Mirin lees, Miso, soy sauce, and the like. These Koji fermentation products may be commercially available. Among these, Koji Amazake, Sake lees, or Mirin lees is preferred, and Koji Amazake is more preferred, from the point of view that sweetness and refreshingness can be easily enhanced.

Koji fermentation products may be used alone or in combination of two or more.

A Koji fermentation product is generally distributed in an aqueous phase of the emulsified oil and fat composition according to the present invention.

The blending amount of a Koji fermentation product can be appropriately adjusted depending on the desired refreshingness and strength of sweetness and the like. The lower limit of the blending amount of a Koji fermented product is preferably 0.3 mass % or more, more preferably 1 mass % or more, even more preferably 2 mass % or more, and most preferably 5 mass % or more relative to the whole emulsified oil and fat composition. The upper limit of the blending amount of a Koji fermented product is preferably 16 mass % or less, more preferably 12 mass % or less, and most preferably 11 mass % or less relative to the whole emulsified oil and fat composition.

A Koji fermentation product used as a raw material for the emulsified oil and fat composition preferably has a pH of 5.0 to 6.0.

(Aqueous Phase)

The aqueous phase of the emulsion includes an aqueous solvent (for example, water), a Koji fermentation product, and optionally a water-soluble component.

The aqueous phase used in the present invention is adjusted to have a pH of 3.1 or more and 6.0 or less. When the pH of the aqueous phase is less than 3.1, good refreshingness may be difficult to be achieved, and sweetness may become less. When the pH of the aqueous phase is more than 6.0, it may be difficult to achieve both refreshingness and sweetness at adequate levels, and in particular, refreshingness may become less.

The lower limit of the pH of the aqueous phase is 3.1 or more, more preferably 3.2 or more, and even more preferably 3.5 or more. The upper limit of the pH of the aqueous phase is 6.0 or less, preferably 5.5 or less, more preferably 5.0 or less, and most preferably 4.5 or less.

The pH of the aqueous phase may be adjusted with any agent which can be used to adjust pH. As such an agent, acidic or alkaline agents known as pH adjusters for food and drink may be used.

Acidic agents for adjusting pH include citric acid, lactic acid, phosphoric acid, and the like. Alkaline agents for adjusting pH include sodium hydrogen carbonate, sodium carbonate, potassium carbonate, and the like. To adjust the pH of the aqueous phase, the above agents may be used alone or in combination, or solutions (fruit juices and the like) containing the above agents may be used.

A fruit juice is preferably included in an aqueous phase from the point of view that an emulsified oil and fat composition having refreshingness and sweetness can be easily obtained. Fruit juices may be squeeze juices of fruit or vegetable itself or a concentrate thereof. Fruit juices may be used alone or in combination of two or more.

There is no particular limitation for the fruit juices, but examples include citrus juices (grapefruit juice, orange juice, lemon juice, and the like), apple juice, coconut juice, and the like. Among these, citrus juices (grapefruit juice, orange juice, lemon juice, and the like) are preferred, and grapefruit juice is particularly preferred from the point of view that a pH can be more easily adjusted to a desired range such that good refreshingness can be achieved more easily.

In the case where a fruit juice is included in an aqueous phase, the lower limit of the content thereof is preferably 0.1 mass % or more, more preferably 0.2 mass % or more relative to the whole emulsified oil and fat composition. In the case where a fruit juice is included in an aqueous phase, the upper limit of the content thereof is preferably 10 mass % or less, more preferably 3 mass % or less, and most preferably 2 mass % or less relative to the whole emulsified oil and fat composition.

The pH of a fruit juice used as a raw material for the emulsified oil and fat composition is preferably 2.5 or more and 4.5 or less, more preferably 2.8 or more and 3.5 or less.

The pH of a Koji fermentation product used as a raw material of the emulsified oil and fat composition is preferably 5.0 or more and 6.5 or less.

The content of each component in an aqueous phase can be appropriately adjusted depending on the components included, and the desired degrees of refreshingness and sweetness. For example, the amounts of components in an aqueous phase may be adjusted so that the Brix value of the aqueous phase preferably falls within a range of 1.5 or more and 40 or less, more preferably 3 or more and 30 or less, and even more preferably 10 or more and 25 or less. A Koji fermentation product included in an aqueous phase is adjusted so that the Brix value thereof is preferably 0.5 or more and 35 or less, more preferably 10 or more and 20 or less. A fruit juice included in an aqueous phase is adjusted so that the Brix value thereof is preferably 0.2 or more and 10 or less, more preferably 0.5 or more and 3 or less.

It is noted that the Brix value of a Koji fermentation product used as a raw material of the emulsified oil and fat composition is preferably 30 or more and 55 or less. The Brix value of a fruit juice used as a raw material of the emulsified oil and fat composition is preferably 35 or more and 65 or less, more preferably 43 or more and 50 or less.

The term "Brix value" as used in the present invention means the concentration of soluble solid components (unit: ° Bx). A commercially available saccharimeter and the like may be used to determine a Brix value.

The content of an aqueous solvent may be any amount as long as it allows the preparation of an emulsified oil and fat composition. The lower limit of the content of an aqueous solvent is preferably 1 mass % or more, more preferably 15 mass % or more relative to the whole emulsified oil and fat composition. The upper limit of the content of an aqueous solvent is preferably 30 mass % or less, more preferably 20 mass % or less relative to the whole emulsified oil and fat composition.

There is no particular limitation for the ratio of the total mass of components in an aqueous phase other than an aqueous solvent to the total mass of the components in the aqueous phase (the total mass of the components of an aqueous phase other than an aqueous solvent/the total mass of the aqueous phase), but for example, it may be preferably 3 or more and 96 or less, more preferably 5 or more and 80 or less, and most preferably 30 or more and 50 or less.

(Oil Phase)

The emulsified oil and fat composition according to the present invention includes any oil and fat which may be commonly blended with an emulsified oil and fat composition. That oil and fat usually corresponds to an oil phase of the emulsified oil and fat composition according to the present invention.

An edible oil and fat is usually used as the oil and fat. Such oils and fats include vegetable oils and fats, animal oils and fats, synthetic oils and fats, modified oils and fats, and the like. These may be used alone, or may be used as a mixed oil in which two or more are combined.

Vegetable oils and fats include soybean oil, rapeseed oil, corn oil, sesame oil, perilla (*Perilla frutescens* var. *crispa*) oil, linseed oil, peanut oil, safflower oil, high-oleic safflower oil, sunflower oil, high-oleic sunflower oil, cottonseed oil, grape seed oil, macadamia nut oil, hazelnut oil, pumpkin seed oil, walnut oil, camellia oil, tea seed oil, perilla (*Perilla frutescens*) oil, borage oil, olive oil, rice bran oil, wheat germ oil, coconut oil, cacao butter, palm oil, palm kernel oil, algae oil, and the like.

Animal oils and fats include fish oil (oils and fats from tuna, mackerel, sardine, bonito, herring, and the like), pork lard, beef tallow, milk fat, mutton tallow, and the like.

Synthetic oils and fats include medium chain fatty acid oils and the like.

Modified oils and fats may be those produced by subjecting the above oils and fats to the desired treatments. Such treatments include fractionation (for example, a low-melting point fraction of fractioned milk fat, fractionation of palm super olein and the like), hardening, transesterification, and the like. One or two or more treatments may be performed on a oil and fat.

From the point of view that an emulsified oil and fat composition can be obtained which can easily be dispersed uniformly in a target material (for example, dough) into which the emulsified oil and fat composition is to be blended, the oil and fat in particular preferably includes a transesterified oil and fat (a) of a laurate-based oil and fat (a1) and a palm-based oil and fat (a2).

The laurate-based oil and fat (a1) as a raw material of the transesterified oil and fat (a) usually has a content of lauric acid of 30 mass % or more in the total constituent fatty acids. Examples of the laurate-based oil and fat (a1) include palm kernel oil, coconut oil, fractionated or hardened oils thereof. These may be used alone or in combination of two or more. Among the examples of the laurate-based oil and fat (a1), palm kernel oil, fractionated or hardened oils thereof are preferred from the point of view that they have higher melting points than coconut oil and the like, and thus can easily confer a high melting point on the transesterified oil and fat (a). When the laurate-based oil and fat (a1) includes a hardened oil, the content of trans fatty acids may disadvantageously increase depending on the degree of hydrogenation. Therefore, preferred are a hardened oil with a small degree of hydrogenation, a hardened oil subjected to cold hardening, or a fully hydrogenated extremely hardened oil. In particular, preferred is an extremely hardened oil.

In the palm-based oil and fat (a2) as a raw material of the transesterified oil and fat (a), the content of fatty acids having a carbon number of 16 or more in the total constituent fatty acids is usually 35 mass % or more. Examples of the palm-based oil and fat (a2) include palm oil, fractionated palm oil, hardened oils thereof, and the like. These may be used alone or in combination of two or more. For the fractionated palm oil, hard fractions, soft fractions, mid-melting point fractions, and the like may be used. When the palm-based oil and fat (a2) includes a hardened oil, the content of trans fatty acids may disadvantageously increase depending on the degree of hydrogenation. Therefore, preferred are a hardened oil with a small degree of hydrogenation, a hardened oil subjected to cold hardening, or a fully hydrogenated extremely hardened oil. In particular, preferred is an extremely hardened oil.

The palm-based oil and fat (a2) preferably contains a oil and fat having an iodine value of 50 or more and 60 or less. Use of a oil and fat with an iodine value of 50 or more and 60 or less allows for the production of a oil and fat having excellent crystallinity by virtue of the amount of saturated fatty acids contained, and also having excellent flavor releasability and plasticity by virtue of unsaturated fatty acids contained.

In the transesterified oil and fat (a), a chemical catalyst or an enzymatic catalyst may be used as a transesterification catalyst for the transesterification reaction of the laurate-based oil and fat (a1) and the palm-based oil and fat (a2). Sodium methylate, sodium hydroxide, or the like may be used as a chemical catalyst. Lipases or the like may be used as an enzymatic catalyst. Examples of lipases include those from *Aspergillus, Alcaligenes*, and the like. Although both a lipase with site selectivity and a lipase without site selectivity can be used, a lipase without site selectivity is preferably used.

An enzymatic catalyst used for the transesterification reaction may be immobilized on a carrier such as ion exchange resin, diatomaceous earth, and ceramics, or may be in the form of powder.

In the case where a chemical catalyst or an enzymatic catalyst without site selectivity is used as a transesterification catalyst, upon completion of the transesterification reaction between the laurate-based oil and fat (a1) and the palm-based oil and fat (a2), the mass ratio (SUS/SSU) in the transesterified oil and fat (a) of symmetrical triglycerides (SUS) to asymmetrical triglycerides (SSU) will fall within a range between 0.45 and 0.55 for di-saturated triglycerides including two saturated fatty acids (S) and one unsaturated fatty acid (U) as constituent fatty acids. A value of SUS/SSU falling within this range can provide good compatibility with other oils and fats.

There is no particular limitation for reaction conditions when a chemical catalyst is used for the transesterification reaction, but the transesterified oil and fat (a) may be obtained, for example, by adding 0.05 to 0.15 mass % of the catalyst relative to the mass of the oils and fats, heating at 80 to 120° C. under reduced pressure, and stirring for 0.5 to 1.0 hours to allow the transesterification reaction of the laurate-based oil and fat (a1) and the palm-based oil and fat (a2) to proceed to the equilibrium.

There is no particular limitation for reaction conditions when an enzymatic catalyst is used for the transesterification reaction, but the transesterified oil and fat (a) may be obtained, for example, by adding 0.01 to 10 mass % of the enzymatic catalyst such as a lipase relative to the mass of the oils and fats and allowing the transesterification reaction to proceed to the equilibrium at 40 to 80° C.

The transesterification reaction may be performed by any of the methods of sequential reactions in columns and of batch reactions. After the transesterification reaction, refinement such as decolorization, deodorization may be performed if needed.

The transesterified oil and fat (a) preferably has an iodine value of 20 or more and 45 or less, more preferably 30 or more and 40 or less. An iodine value falling within this range can provide good compatibility with other oils and fats, and can readily provide an emulsified oil and fat composition having good sweetness, richness, and refreshingness as well as a good emulsified state, leading to an emulsified oil and fat composition having particularly good refreshingness. The transesterified oil and fat (a) may be used alone or in combination of two or more. When two or more transesterified oils and fats (a) are used in combination, the iodine value of the total oils and fats can be adjusted so as to fall within the above range.

In the oil and fat composition according to the present invention, the content of the transesterified oil and fat (a) is preferably 40 mass % or less, more preferably 20 mass % or more and 35% or less relative to the mass of the total oils and fats. A content of the transesterified oil and fat (a) falling within this range can readily provide an emulsified oil and fat composition having good refreshingness, sweetness, and richness.

Gas chromatography can determine the proportion of lauric acid in the total constituent fatty acids for the laurate-based oil and fat (a1), the content of fatty acids having a carbon number of 16 or more in the total constituent fatty acids for the palm-based oil and fat (a2), and the equilibrium of transesterification reactions.

The content of a oil and fat (when a plurality of oils and fats are included, the total amount of oils and fats) may be any amount as long as it allows the preparation of an emulsified oil and fat composition. The lower limit of the content of a oil(s) and fat(s) is preferably 70 mass % or more, more preferably 80 mass % or more relative to the whole emulsified oil and fat composition. The upper limit of the content of a oil(s) and fat(s) is preferably 98 mass % or less, more preferably 85 mass % or less relative to the whole emulsified oil and fat composition.

(Other Components)

The emulsified oil and fat composition according to the present invention has an aqueous phase and/or an oil phase in which an emulsifying agent, a saccharide, a thickening stabilizer, a protein, an alcohol, a coloring agent, a taste material, a flavoring (a flavoring agent), and the like may be blended if required in addition to the above substances.

There is no particular limitation for emulsifying agents as long as they can be commonly added to food products, but they include, for example, monoglycerin fatty acid esters, polyglycerin fatty acid esters, sucrose fatty acid esters, propylene glycol fatty acid esters, sorbitan fatty acid esters, glycerin organic acid fatty acid esters, lecithins (soybean lecithin, egg-yolk lecithin, enzymatically degradated lecithin, and the like), sphingolipid, plant sterols, tomato glucolipids, saponins (soybean saponin, Quillaja saponin, and the like), polysorbates, stearoyl lactates (sodium, calcium), and the like. These may be used alone or in combination of two or more.

The content of an emulsifying agent may be any amount as long as it allows the preparation of an emulsified oil and fat composition. When an emulsifying agent is included in an emulsified oil and fat composition, the lower limit of the content thereof is preferably 0.01 mass % or more, more preferably 0.1 mass % or more relative to the whole emulsified oil and fat composition. When an emulsifying agent is included in an emulsified oil and fat composition, the upper limit of the content thereof is preferably 2.0 mass % or less, more preferably 1.0 mass % or less relative to the whole emulsified oil and fat composition.

As the saccharide, exemplified are, for example, sugar, isomerized sugar, liquid sugar, saccharified starch, sugar alcohol, lactose, and the like. Examples of the above sugar alcohol include sugar alcohol of monosaccharide (sorbitol, erythritol, xylitol, mannitol, galactitol, and the like), sugar alcohol of disaccharide (maltitol, isomaltitol, lactitol), sugar alcohol of trisaccharide (maltotriitol, isomaltotriitol, panitol, and the like), sugar alcohol of tetrasaccharide (maltotetraitol and the like), and the like.

As the thickening stabilizer, exemplified are, for example, agar, sodium alginate, PGA (propylene glycol alginate), carrageenan, xanthane gum, guar gum, glucomannan, gellan gum, soybean polysaccharides, inulin, tara gum, locust bean gum, curdlan, gum arabic, tamarind seed gum, welan gum, pectin, crystalline cellulose, cellulose ether, and the like. Examples of the above cellulose ether include methyl cellulose, carboxymethylcellulose, hydroxypropylcellulose, hydroxypropylmethylcellulose, and the like.

Examples of the protein include, for example, whole milk powder, skimmilk powder, butter milk powder, whey powder, whey powder with concentrated protein, casein sodium, casein potassium, concentrated milk, concentrated skimmilk, sugar-free condensed milk, sugar-free condensed skimmilk, sweetened condensed milk, sweetened condensed skimmilk, cream powder, sweetened powdered milk, formula milk powder, cow's milk, fresh cream, cheese (natural cheese, processed cheese, and the like), fermented milk, soybean protein, green-peas protein, wheat protein, and the like. Decomposition products thereof can also be used suitably.

Examples of the alcohol include, for example, ethanol, glycerin, and the like.

Examples of the taste material include fermentation products, extracts, and the like of various animal and plant materials. For example, exemplified are barley fermentation products, seafood extracts (Dashi), mushroom extracts, yeast extracts, and the like.

Examples of the flavoring include, for example, butter flavorings, milk flavorings, cream flavorings, cheese flavorings, chocolate flavorings, coffee flavorings, tea flavorings, custard flavorings, nuts flavorings, fruit flavorings, honey flavorings, maple flavorings, and the like.

(Animal-Origin Raw Materials)

The emulsified oil and fat composition according to the present invention has refreshingness and sweetness. The refreshingness and sweetness achieved with the emulsified oil and fat composition according to the present invention are comparable with those achieved with an emulsified oil and fat composition including an animal-origin raw material. Therefore, the emulsified oil and fat composition according to the present invention does not need to include an animal-origin raw material. However, an aspect shall not be excluded in which an animal-origin raw material is included in the emulsified oil and fat composition according to the present invention. When an animal-origin raw material is included in the emulsified oil and fat composition according to the present invention, the total amount thereof may be small, for example, 10 mass % or less relative to the whole emulsified oil and fat composition.

The term "animal-origin raw material" as used in the present invention means a raw material derived from mammal (cow, swine, goat, sheep, and the like), including, for example, animal fats, milk constituents, and processed products thereof (fresh milk, powdered milk, butter, cheese, and the like).

Examples of the "emulsified oil and fat composition including an animal-origin raw material" as used in the present invention include, for example, butter, cheese, compounds (including plant fats and milk fats), margarine, and the like. The emulsified oil and fat composition according to the present invention can be a substitute for emulsified oil and fat compositions including these animal-origin raw materials.

(Blending Ratio of Each Component)

In view of facilitating the effects of the present invention, the components of the emulsified oil and fat composition are preferably adjusted so as to satisfy any or all of the followings.

In the emulsified oil and fat composition, the ratio of the mass of a Koji fermented product to the mass of a fruit juice may be preferably adjusted to 0.1 or more and 65 or less, more preferably 5 or more and 30 or less. When the ratio of the mass of a Koji fermentation product to the mass of a fruit juice falls within the above range, an emulsified oil and fat composition having good refreshingness, sweetness, and richness can easily be obtained, and further fermentation smell can be suppressed to improve richness and aroma when the emulsified oil and fat composition is blended with bread and the like.

In the emulsified oil and fat composition, the ratio of the Brix value of a Koji fermented product to the Brix value of a fruit juice may be preferably adjusted to 0.03 or more and 120 or less, more preferably 2.0 or more and 60 or less, and most preferably 3.5 or more and 25 or less. When the ratio of the Brix value of a Koji fermented product to the Brix value of a fruit juice falls within the above range, an emulsified oil and fat composition having good refreshingness, sweetness, and richness can easily be obtained, and further fermentation smell can be suppressed to improve richness and aroma when the emulsified oil and fat composition is blended with bread and the like.

<Method of Manufacturing Emulsified Oil and Fat Composition>

The emulsified oil and fat composition according to the present invention can be manufactured by any method known as a method of manufacturing an emulsified oil and fat composition including an aqueous phase and an oil phase.

There is no particular limitation for the type of an emulsified oil and fat composition, but examples include water-in-oil (W/O) emulsions, oil-in-water-in-oil (O/W/O) emulsions, oil-in-water (O/W) emulsions, water-in-oil-in-water (W/O/W) emulsions, and the like. The emulsified oil and fat composition according to the present invention, which can be a substitute for butter and the like, is preferably a water-in-oil emulsified oil and fat composition, more preferably a plastic water-in-oil emulsified oil and fat composition.

An aqueous phase and an oil phase can be obtained by appropriately mixing and stirring components of each phase with a stirrer and the like.

An emulsion may be obtained by any method as long as it allows for the manufacture of an emulsion from an aqueous phase and an oil phase. Such methods include a method involving adding an oil phase to an aqueous phase with stirring, a method involving adding an aqueous phase to an oil phase with stirring, a method involving adding an aqueous phase and an oil phase simultaneously for mixing, and the like. When an emulsifying agent is used, it can be added to an aqueous phase and an oil phase at any timing depending on its nature and the like.

The proportion (mass ratio) of an aqueous phase vs. an oil phase is preferably aqueous phase:oil phase=30:70 to 10:90 for manufacturing the emulsified oil and fat composition according to the present invention.

<Characteristics of Emulsified Oil and Fat Composition>

The emulsified oil and fat composition according to the present invention has refreshingness and sweetness. The emulsified oil and fat composition according to the present invention may also have richness. The presence or the degree of the refreshingness, sweetness, and richness of the emulsified oil and fat composition may be determined by the sensory evaluations described in Examples.

<Applications of Emulsified Oil and Fat Composition>

The emulsified oil and fat composition according to the present invention can be blended with any drinks, food products, and the like. The emulsified oil and fat composition according to the present invention can improve the flavors (richness, aroma, and the like) of food and drink and others in which the composition is blended.

The emulsified oil and fat composition according to the present invention can suppress uncomfortable smell (fermentation smell, bran smell, collagen smell, and the like) from raw materials of food and drink and others in which the emulsified oil and fat composition according to the present invention is blended.

The emulsified oil and fat composition according to the present invention can be a substitute for an emulsified oil and fat composition including an animal-origin raw material (for example, butter), and thus can be used as margarine, fat-spread, and the like.

Examples of food and drink in which the emulsified oil and fat composition according to the present invention can be blended include, but not limited to, confectionery (for example, cookies), bread making (for example, bread), and the like.

EXAMPLES

Below, the present invention will be described in more detail by way of Examples, but the present invention shall not be limited to these Examples.

<Production of Emulsified Oil and Fat Composition>

The following method was used to produce emulsified oil and fat compositions having the oil phases and the aqueous phases shown in Tables 2 to 5.

(1) Fat components of an oil phase were mixed, and then the temperature was adjusted to 75° C. to obtain the oil phase.

(2) All components of an aqueous phase were added to water, and heat sterilized at 85° C. to obtain the aqueous phase.

(3) The aqueous phase was added to the oil phase, and stirred with a propeller stirrer for emulsification (water-in-oil), and then quenched and kneaded with a Perfector to obtain a water-in-oil emulsified oil and fat composition.

(4) The resulting emulsified oil and fat composition was stored at 5° C. until subjected to the following sensory tests.

The details of the transesterified oils and fat oil and fat 1 to 3 shown in Tables 2 to 5 are as follows.

(Transesterified Oil and Fat 1)

It is a transesterified oil and fat of the laurate-based oil and fat (a1-1) and the palm-based oil and fat (a2-1) described below.

Laurate-based oil and fat (a1-1): palm kernel oil (iodine value of 18)

Palm-based oil and fat (a2-1): palm oil (iodine value of 53) Reaction conditions: A transesterification reaction was performed using 50 mass % of the palm kernel oil and 50 mass % of the palm oil as raw materials to obtain a transesterified oil and fat 1. The iodine value of this oil and fat was 35.5.

(Transesterified Oil and Fat 2)

It is a transesterified oil and fat of the laurate-based oil and fat (a1-2) and the palm-based oil and fat (a2-2) described below.

Laurate-based oil and fat (a1-2): palm kernel extremely hardened oil (iodine value of 2)

Palm-based oil and fat (a2-2): palm oil (iodine value of 53) and palm extremely hardened oil (iodine value of 2)

Reaction conditions: 25 mass % of the palm kernel extremely hardened oil, 50 mass % of the palm oil, and 25 mass % of the palm extremely hardened oil were mixed and heated at 110° C. After sufficiently dehydrated, sodium methylate was added as a chemical catalyst at 0.08 mass % of the oil and fat content to allow a transesterification reaction to occur with stirring at 100° C. for 0.5 hours under reduced pressure. After the transesterification reaction, the catalyst was removed by washing with water, and decolorized using activated white clay, and further deodorized to obtain a transesterified oil and fat 2. The iodine value of this oil and fat was 27.5.

(Transesterified Oil and Oil and Fat 3)

It is a transesterified oil and fat of the following palm-based oil and fat (a2-3).

Palm-based oil and fat (a2-3): palm fractionated soft oil
Reaction conditions: The palm fractionated soft oil in an amount of 100 mass % was used as the sole raw material, and a transesterification reaction was performed to obtain a transesterified oil and fat 3. The iodine value of this oil and fat was 56.

For preparing a water-in-oil emulsified oil and fat composition, and an oil phase and an aqueous phase were mixed at oil phase:aqueous phase=83:17 by mass ratio in Examples other than Example 4-2 and in Comparative Examples. In Example 4-2, an oil phase and an aqueous phase were mixed at oil phase:aqueous phase=70:30 by mass ratio. It is noted that the amount of a solvent (water) in an aqueous phase corresponds to an amount obtained by subtracting a numerical value listed under "Material" of "Aqueous phase" from "Total amount of aqueous phase".

In Tables 2 to 5, the unit of numerical values listed under the sections "Oil phase", "total amount of oil phase", "Material" of "Aqueous phase", and "Total amount of aqueous phase" are in "mass %". The numerical values listed under the section of "Oil phase" each mean a proportion of the corresponding component in "Total amount of oil phase". For example, in "Example 1-1", "Transesterified fat 1" was blended in an amount of 25 mass % relative to "Total amount of oil phase". The numerical values listed under the section of "Material" of "Aqueous phase" each mean a proportion (mass %) of the corresponding component in the whole emulsified oil and fat composition. The numerical values listed under the section of "Total amount of aqueous phase" each mean a proportion (mass %) of the total amount of aqueous phase (the total amount of components listed under "Material" and a solvent) in the whole emulsified oil and fat composition.

In Tables 2 to 5, the numerical values listed at the upper portions of cells in the lines of "Koji fermentation product" and "Fruit juice" (numbers without brackets) under the section of "Aqueous phase" (in the section of "Material") correspond to the amounts of components (Unit: mass %), and the numerical values listed at the lower portions (numbers with brackets) correspond to the Brix values in the corresponding component (the amount of soluble solid components, unit: ° Bx). This means that, for example, in "Example 1-1", the blending amount of "Koji fermentation product 1" is "0.5 mass %" relative to the whole emulsified oil and fat composition, and the Brix value in the corresponding aqueous phase is "1.0° Bx". It is noted that the Brix value in the corresponding aqueous phase of a Koji fermentation product can be calculated from the Brix value of that Koji fermentation product shown in Table 1. For example, the Brix value in the corresponding aqueous phase of "Koji fermentation product 1" in "Example 1-1" can be calculated as follows: 35 (the Brix value of the Koji fermentation product 1)×0.5 (the blending ratio relative to the whole emulsified oil and fat composition)/17 (the total amount of aqueous phase)=about 1.0° Bx.

In Tables 2 to 5, "pH of aqueous phase" refers to a pH of an aqueous phase measured with a pH meter (LAQUA D-72, HORIBA, Ltd.).

In Tables 2 to 5, the "Brix value of aqueous phase" refers to a Brix value in an aqueous phase measured with a saccharimeter (HAND REFRACTOMETER, made by ATAGO Co., Ltd.).

In Tables 2 to 5, the "Brix value of aqueous phase" means the total amount of soluble solid components (unit: ° Bx) included in "Koji fermentation product" and "Fruit juice" in the corresponding aqueous phase.

In Tables 2 to 5, the numerical values listed at the upper portions of cells in the section of "Koji fermentation product/Fruit juice" (numbers without brackets) correspond to the ratio of the mass of "Koji fermentation product" to the mass of "Fruit juice", and the numerical values listed at the lower portions (numbers with brackets) correspond to the ratio of the Brix value "Koji fermentation product" to the Brix value of "Fruit juice".

In Tables 2 to 5, "Components of aqueous phase/Total amount of aqueous phase" means a proportion of the total amount of the components listed under the section "Material" of "Aqueous phase" relative to the numerical value listed under "Total amount of aqueous phase".

The Brix and pH values of the raw materials used in this example are shown in Table 1. It is noted that the Koji fermentation products 1 to 3 in Table 1 are all Koji fermentation products of rice.

TABLE 1

| | Brix value ( ° Bx) | pH |
|---|---|---|
| Koji fermentation product 1 (Koji Amazake) | 35 | 5.5 |
| Koji fermentation product 2 (Sake lees) | 49 | 5.8 |
| Koji fermentation product 3 (Mirin lees) | 45 | 5.9 |
| Grapefruit juice | 46 | 3.1 |
| Orange juice | 63 | 3.7 |
| Lemon juice | 42 | 2.7 |

<Production of Bread>

Bread was produced by the following method using the emulsified oil and fat compositions produced above.

(1) Sponge Step

Water having dispersed yeast and hard wheat flour were charged into a mixer ball, and mixed using a hook for 4 minutes at a low speed and 1 minute at a medium-low speed. The kneading temperature was set to 24° C. Then, fermentation was performed under the conditions of at 27° C. and a humidity of 75% for 4 hours. The temperature at the end of fermentation was 29° C. After fermentation, a sponge dough was obtained.

[Sponge Composition]
 Hard wheat flour: 70 parts by mass
 Yeast: 2.5 parts by mass
 Water: 40 parts by mass

[Conditions for Sponge Step]
 Mixing: 3 minutes at a low speed, and 1 minute at medium-low speed (using a hook)
 Kneading temperature: 24° C.
 Fermentation conditions: at a temperature in the fermentation room of 27° C. and a humidity of 75% for 3 hours (2) Main Kneading Step Materials other than an emulsified oil and fat composition among those listed in the following "compositions of main kneading" were mixed with the sponge dough for 3 minutes at a low speed and 3 minutes at a medium-low speed, and then the corresponding emulsified oil and fat composition was charged and further mixed for 3 minutes at a low speed and 4 minutes at a medium-low speed to obtain a bread dough. The kneading temperature was set to 28° C. Subsequently, the dough was allowed to stand for a floor time of 20 minutes at room temperature, and then divided, and again allowed to stand for a bench time of 20 minutes. The dough was shaped in a 3-loaf baking mold, and allowed to ferment for 45 minutes at 38° C. and a humidity of 80% in a proofer, and then baked at 200° C. for 40 minutes to obtain bread. After the baking, the resulting bread was allowed to cool at room temperature for 2 hours. After cooled, the bread was stored at 20° C. for one day before subjected to the following sensory evaluation.

[Composition of Main Kneading]
 Hard wheat flour: 30 parts by mass
 Superfine sugar: 6 parts by mass
 Salt: 1.8 parts by mass
 Emulsified oil and fat composition (according to the present invention): 5 parts by mass
 Water: 25 parts by mass

[Conditions for Main Kneading Step]
 Mixing: 3 minutes at a low speed and 3 minutes at a medium-low speed
 3 minutes at a low speed and 4 minutes at a medium-low speed after charging an emulsified oil and fat composition
 Kneading temperature: 28° C.
 Floor time: 20 minutes at 28° C.
 Divided dough: 230 g
 Bench time: 20 minutes at 28° C.
 Molding: a dough was rolled and formed into rolls with a molder, and then shaped into a U-shape and packed into a Pullman mold.
 Proofer: a temperature in the proofer room of 38° C., a humidity of 80%, for 40 minutes
 Baking: at 200° C. for 40 minutes <Emulsified Oil and Fat Compositions and Sensory Evaluation of Bread>

The resulting emulsified oil and fat compositions and bread were subjected to sensory evaluation by a panel of 20 people in accordance with the following criteria. The results are shown in the section "Evaluation" in Tables 2 to 5.

It is noted that the sensory evaluation was performed by a panel selected as follows. The panel candidates were subjected to the five-taste (sweetness, sourness, saltiness, bitterness, and umami taste) discrimination test, the taste concentration discrimination test, the food taste discrimination test, the standard odor test, and 8 males and 12 females in their 20s to 40s who passed each of these tests were selected as members of the panel. Further, in conducting the evaluation, the entire panel made discussion and reconciled the nature of each item of the evaluation to ensure that all the panel shared common understandings. Moreover, to eliminate panel bias in the sensory evaluation and improve the accuracy of the evaluation, the number of test sections and contents of samples were not informed to the panel, and the samples were given in a random manner.

(Refreshingness of emulsified oil and fat compositions)
 Very Good+ (indicated by bullseye symbol+ (⊙+)): 17 or more among 20 persons sensed refreshingness.
 Very Good (indicated by bullseye symbol (⊙)): 13 or more and 16 or less among 20 persons sensed refreshingness.
 Good (indicated by circle symbol (○)): 9 or more and 12 or less among 20 persons sensed refreshingness.
 Fair (indicated by triangle symbol (Δ)): 5 or more and 8 or less among 20 persons sensed refreshingness.
 Poor (indicated by cross symbol (x)): 4 or less among 20 persons sensed refreshingness.

(Sweetness and Richness of Emulsified Oil and Fat Compositions)
 Very Good+ (indicated by bullseye symbol+ (⊙+)): 17 or more among 20 persons sensed sweetness and richness.
 Very Good (indicated by bullseye symbol (⊙)): 13 or more and 16 or less among 20 persons sensed sweetness and richness.
 Good (indicated by circle symbol (○)): 9 or more and 12 or less among 20 persons sensed sweetness and richness.
 Fair (indicated by triangle symbol (A)): 5 or more and 8 or less among 20 persons sensed sweetness and richness.
 Poor (indicated by cross symbol (x)): 4 or less among 20 persons sensed sweetness and richness.

(Fermentation Smell of Bread)
 Very Good+ (indicated by bullseye symbol+ (⊙+)): 17 or more among 20 persons did not sense fermentation smell.
 Very Good (indicated by bullseye symbol (⊙)): 13 or more and 16 or less among 20 persons did not sense fermentation smell.
 Good (indicated by circle symbol (○)): 9 or more and 12 or less among 20 persons did not sense fermentation smell.
 Fair (indicated by triangle symbol (Δ)): 5 or more and 8 or less among 20 persons did not sense fermentation smell.
 Poor (indicated by cross symbol (x)): 4 or less among 20 persons did not sense fermentation smell.

(Richness and Aroma of Bread)
 Very Good+ (indicated by bullseye symbol+ (⊙+)): 17 or more among 20 persons sensed richness and aroma.
 Very Good (indicated by bullseye symbol (⊙)): 13 or more and 16 or less among 20 persons sensed richness and aroma.
 Good (indicated by circle symbol (○)): 9 or more and 12 or less among 20 persons sensed richness and aroma.
 Fair (indicated by triangle symbol (Δ)): 5 or more and 8 or less among 20 persons sensed richness and aroma.
 Poor (indicated by cross symbol (x)): 4 or less among 20 persons sensed richness and aroma.

TABLE 2

| | | Example 1-1 | Example 1-2 | Example 1-3 | Example 1-4 | Example 1-5 | Example 1-6 | Example 1-7 | Example 1-8 | Example 1-9 | Example 1-10 |
|---|---|---|---|---|---|---|---|---|---|---|---|
| Oil phase | Transesterified oil and fat 1 | 25 | 25 | 25 | 25 | 25 | 25 | 25 | 25 | 25 | 25 |
| | Transesterified oil and fat 3 | 20 | 20 | 20 | 20 | 20 | 20 | 20 | 20 | 20 | 20 |
| | Palm fractionated hardened oil | 15 | 15 | 15 | 15 | 15 | 15 | 15 | 15 | 15 | 15 |
| | Palm oil | 15 | 15 | 15 | 15 | 15 | 15 | 15 | 15 | 15 | 15 |
| | Rapeseed oil | 25 | 25 | 25 | 25 | 25 | 25 | 25 | 25 | 25 | 25 |
| | Total amount of oil phase | 100 | 100 | 100 | 100 | 100 | 100 | 100 | 100 | 100 | 100 |
| Aqueous phase | Material Koji fermentation product 1 (Koji Amazake) | 0.5 (1.0) | 1.2 (2.5) | 1.2 (2.5) | 4 (8.2) | 6 (12.4) | 8 (16.5) | 12 (24.7) | 16 (32.9) | 0.3 (0.6) | |
| | Koji fermentation product 2 (Sake lees) | | | | | | | | | | 1 (2.9) |
| | Grapefruit fruit juice | 0.3 (0.8) | 0.3 (0.8) | 0.3 (0.8) | 0.3 (0.8) | 0.3 (0.8) | 0.3 (0.8) | 0.3 (0.8) | 0.3 (0.8) | 6 (16.2) | |
| | Sucrose | | | | | | | | | | 3 |
| | Sodium hydrogen carbonate | | | 0.003 | | | | | | | |
| | pH of aqueous phase | 3.3 | 3.6 | 4.2 | 4.0 | 4.2 | 4.3 | 4.5 | 4.6 | 3.1 | 5.0 |
| | Brix value of aqueous phase | 1.8 | 3.3 | 3.3 | 9.0 | 13.2 | 17.3 | 25.5 | 33.7 | 16.8 | 20.5 |
| | Koji fermentation product/ fruit juice | 1.7 (1.3) | 4.0 (3.1) | 4.0 (3.1) | 13.3 (10.3) | 20.0 (15.5) | 26.7 (20.6) | 40.0 (30.9) | 53.3 (41.1) | 0.1 (0.04) | — |
| | Total amount of aqueous phase | 17 | 17 | 17 | 17 | 17 | 17 | 17 | 17 | 17 | 17 |
| | Components of aqueous phase/ total amount of aqueous phase | 4.7 | 8.8 | 8.8 | 25.3 | 37.1 | 48.8 | 72.4 | 95.9 | 37.1 | 23.5 |
| Evaluation | Refreshingness of emulsified oil and fat compositions | ◎ | ◎+ | ◎ | ◎+ | ◎+ | ◎+ | ◎+ | ○ | ○ | ○ |
| | Sweetness and richness of emulsified oil and fat composition | ○ | ◎ | ◎ | ◎+ | ◎+ | ◎+ | ◎+ | ◎ | ○ | ◎ |
| | Fermentation smell of bread | ○ | ○ | ◎ | ◎ | ◎+ | ◎+ | ◎ | ○ | ○ | ◎ |
| | Richness and aroma of bread | ○ | ◎ | ◎ | ◎ | ◎+ | ◎+ | ◎+ | ◎+ | ○ | ◎+ |

TABLE 3

| | | Example 2-1 | Example 2-2 | Example 2-3 | Example 2-4 | Example 2-5 | Example 2-6 | Example 2-7 | Example 2-8 | Example 2-9 | Example 2-10 |
|---|---|---|---|---|---|---|---|---|---|---|---|
| Oil phase | Transesterified oil and fat 1 | 25 | 25 | 25 | 25 | 37 | 25 | 25 | 15 | 25 | 25 |
| | Transesterified oil and fat 2 | | | | | | | | 20 | | |
| | Transesterified oil and fat 3 | 20 | 20 | 20 | 20 | 17 | 20 | 20 | 15 | 20 | 20 |
| | Palm fractionated hardened oil | 15 | 15 | 15 | 15 | 13 | 15 | 15 | 25 | 15 | 15 |
| | Palm oil | 15 | 15 | 15 | 15 | 13 | 15 | 15 | | 15 | 15 |
| | Rapeseed oil | 25 | 25 | 25 | 25 | 20 | 25 | 25 | 25 | 25 | 25 |
| | Total amount of oil phase | 100 | 100 | 100 | 100 | 100 | 100 | 100 | 100 | 100 | 100 |
| Aqueous phase | Material Koji fermentation product 1 (Koji Amazake) | | | 6 (12.4) | 6 (12.4) | 6 (12.4) | 6 (12.4) | 6 (12.4) | 3 (6.2) | 6 (12.4) | 8 (16.5) |
| | Koji fermentation product 2 (Sake lees) | 1 (2.9) | | | | | | | | | |
| | Koji fermentation product 3 (Mirin lees) | | 1 (2.6) | | | | | | | | |
| | Grapefruit fruit juice | | | 0.3 (0.8) | 0.3 (0.8) | 0.3 (0.8) | 0.3 (0.8) | 0.3 (0.8) | | | |
| | Sucrose | 3 | | | | | | | | | |
| | Sodium hydrogen carbonate | | | 0.018 | 0.012 | | | | | | |
| | Citric acid | 0.015 | 0.015 | | | | 0.045 | 0.065 | | | 0.01 |
| | pH of aqueous phase | 4.3 | 4.2 | 5.7 | 5.1 | 4.2 | 3.4 | 3.2 | 5.8 | 5.3 | 4.2 |
| | Brix value of aqueous phase | 20.5 | 2.6 | 13.2 | 13.2 | 13.2 | 13.2 | 13.3 | 6.2 | 12.4 | 16.5 |
| | Koji fermentation product/ fruit juice | — | — | 20.0 (15.5) | 20.0 (15.5) | 20.0 (15.5) | 20.0 (15.5) | 20.0 (15.5) | — | — | — |
| | Total amount of aqueous phase | 17 | 17 | 17 | 17 | 17 | 17 | 17 | 17 | 17 | 17 |
| | Components of aqueous phase/ total amount of aqueous phase | 23.6 | 6.0 | 37.2 | 37.1 | 37.1 | 37.3 | 37.4 | 17.6 | 35.3 | 47.1 |
| Evaluation | Refreshingness of emulsified oil and fat compositions | ◎ | ◎ | ○ | ◎ | ○ | ◎ | ○ | ○ | ○ | ◎ |
| | Sweetness and richness of emulsified oil and fat composition | ◎ | ○ | ◎ | ◎ | ○ | ◎ | ○ | ○ | ○ | ◎ |

TABLE 3-continued

|  | Exam- ple 2-1 | Exam- ple 2-2 | Exam- ple 2-3 | Exam- ple 2-4 | Exam- ple 2-5 | Exam- ple 2-6 | Exam- ple 2-7 | Exam- ple 2-8 | Exam- ple 2-9 | Exam- ple 2-10 |
|---|---|---|---|---|---|---|---|---|---|---|
| Fermentation smell of bread | ◎+ | ◎ | ◎ | ◎ | ◎+ | ◎ | ◎ | ○ | ◎ | ◎ |
| Richness and aroma of bread | ◎+ | ◎+ | ◎ | ◎+ | ◎+ | ◎+ | ◎ | ○ | ◎ | ◎+ |

TABLE 4

|  |  |  | Exam- ple 3-1 | Exam- ple 3-2 | Exam- ple 3-3 | Exam- ple 3-4 | Exam- ple 3-5 | Exam- ple 3-6 | Exam- ple 3-7 | Exam- ple 3-8 | Exam- ple 3-9 | Exam- ple 3-10 |
|---|---|---|---|---|---|---|---|---|---|---|---|---|
| Oil phase | Transesterified oil and fat 1 | | 25 | 25 | 25 | 25 | 25 | 25 | 25 | 25 | | |
| | Transesterified oil and fat 2 | | | | | | | | | | | 25 |
| | Transesterified oil and fat 3 | | 20 | 20 | 20 | 20 | 20 | 20 | 20 | 20 | 50 | 20 |
| | Palm fractionated hardened oil | | 15 | 15 | 15 | 15 | 15 | 15 | 15 | 15 | | 15 |
| | Palm oil | | 15 | 15 | 15 | 15 | 15 | 15 | 15 | 15 | 20 | 15 |
| | Rapeseed oil | | 25 | 25 | 25 | 25 | 25 | 25 | 25 | 25 | 25 | 25 |
| | Rapeseed extremely hardened oil | | | | | | | | | | 5 | |
| | Total amount of oil phase | | 100 | 100 | 100 | 100 | 100 | 100 | 100 | 100 | 100 | 100 |
| Aqueous phase | Material | Koji fermentation product 1 (Koji Amazake) | 8 (16.5) | 6 (12.4) | 6 (12.4) | 6 (12.4) | 6 (12.4) | 12 (24.7) | 6 (12.4) | 6 (12.4) | 6 (12.4) | 6 (12.4) |
| | | Grapefruit fruit juice | | 0.1 (0.3) | 1 (2.7) | 1 (2.7) | 3.5 (9.5) | 1 (2.7) | | | 0.3 (0.8) | 0.3 (0.8) |
| | | Orange juice | | | | | | | 0.22 (0.8) | | | |
| | | Lemon juice | | | | | | | | 0.25 (0.6) | | |
| | | Sodium hydrogen carbonate | | | | | 0.05 | | | | | |
| | | Citric acid | 0.05 | | | | | | 0.01 | | | |
| | | pH of aqueous phase | 3.6 | 4.7 | 3.7 | 4.2 | 3.3 | 3.6 | 4.2 | 4.0 | 4.2 | 4.2 |
| | | Brix value of aqueous phase | 16.5 | 12.7 | 15.1 | 15.1 | 21.9 | 27.4 | 13.2 | 13.0 | 13.2 | 13.2 |
| | | Koji fermentation product/ fruit juice | — | 60.0 (41.3) | 6.0 (4.6) | 6.0 (4.6) | 1.7 (1.3) | 12.0 (9.1) | 27.3 (15.5) | 24.0 (20.7) | 20.0 (15.5) | 20.0 (15.5) |
| | | Total amount of aqueous phase | 17 | 17 | 17 | 17 | 17 | 17 | 17 | 17 | 17 | 17 |
| | | Components of aqueous phase/ total amount of aqueous phase | 47.4 | 35.9 | 41.2 | 41.5 | 55.9 | 76.5 | 36.6 | 36.8 | 37.1 | 37.1 |
| Eval- uation | Refreshingness of emulsified oil and fat compositions | | ○ | ◎ | ◎ | ◎+ | ○ | ◎+ | ◎ | ◎ | ○ | ◎ |
| | Sweetness and richness of emulsified oil and fat composition | | ○ | ◎+ | ◎+ | ◎+ | ○ | ◎+ | ◎+ | ◎+ | ◎ | ◎ |
| | Fermentation smell of bread | | ○ | ◎ | ◎+ | ◎+ | ◎ | ◎ | ◎+ | ◎+ | ◎ | ◎ |
| | Richness and aroma of bread | | ◎+ | ◎+ | ◎+ | ◎+ | ◎ | ◎+ | ◎+ | ◎+ | ◎ | ◎ |

TABLE 5

|  |  | Exam- ple 4-1 | Exam- ple 4-2 | Com- parative Exam- ple 1 | Com- parative Exam- ple 2 | Com- parative Exam- ple 3 | Com- parative Exam- ple 4 | Com- parative Exam- ple 5 |
|---|---|---|---|---|---|---|---|---|
| Oil phase | Transesterified oil and fat 1 | 20 | 25 | 25 | 25 | 15 | 25 | 25 |
| | Transesterified oil and fat 2 | 10 | | | | 20 | | |
| | Transesterified oil and fat 3 | 25 | 20 | 20 | 20 | 15 | 20 | 20 |
| | Palm fractionated hardened oil | | 15 | 15 | 15 | 25 | 15 | 15 |
| | Palm oil | 20 | 15 | 15 | 15 | | 15 | 15 |
| | Rapeseed oil | 25 | 25 | 25 | 25 | 25 | 25 | 25 |
| | Total amount of oil phase | 100 | 100 | 100 | 100 | 100 | 100 | 100 |
| Aqueous phase | Material Koji fermentation product 1 (Koji Amazake) | 6 (12.4) | 10.6 (21.9) | | 8 (16.5) | 1 (2.1) | 6 (12.4) | 6 (12.4) |
| | Grapefruit fruit juice | 0.3 (0.8) | 0.5 (1.4) | 0.3 (0.8) | | | 0.3 (0.8) | 0.3 (0.8) |

TABLE 5-continued

| | Example 4-1 | Example 4-2 | Comparative Example 1 | Comparative Example 2 | Comparative Example 3 | Comparative Example 4 | Comparative Example 5 |
|---|---|---|---|---|---|---|---|
| Sodium hydrogen carbonate | | | | | | | 0.031 |
| Citric acid | | | | 0.1 | | 0.105 | |
| pH of aqueous phase | 4.2 | 4.2 | 3.3 | 3.0 | 6.2 | 2.8 | 7 |
| Brix value of aqueous phase | 13.2 | 23.3 | 0.8 | 16.5 | 2.1 | 13.2 | 13.2 |
| Koji fermentation product/ fruit juice | 20.0 (15.5) | 21.2 (15.6) | 0.0 (0.0) | — | — | 20.0 (15.5) | 20.0 (15.5) |
| Total amount of aqueous phase | 17 | 30 | 17 | 17 | 17 | 17 | 17 |
| Components of aqueous phase/ total amount of aqueous phase | 37.1 | 37.0 | 1.8 | 47.6 | 5.9 | 37.7 | 37.2 |
| Evaluation  Refreshingness of emulsified oil and fat compositions | ☉+ | ☉+ | Δ | X | X | Δ | X |
| Sweetness and richness of emulsified oil and fat composition | ☉+ | ☉+ | X | Δ | X | Δ | Δ |
| Fermentation smell of bread | ☉+ | ☉+ | X | Δ | X | Δ | X |
| Richness and aroma of bread | ☉+ | ☉+ | X | Δ | Δ | Δ | Δ |

As shown in Tables 2 to 5, the emulsified oil and fat compositions according to the present invention had refreshingness as well as sweetness and richness. Moreover, loaves of bread having the emulsified oil and fat compositions according to the present invention had good richness and aroma while fermentation smell was suppressed.

In contrast, the emulsified oil and fat compositions that did not satisfy the requirements of the present invention were significantly inferior in terms of refreshingness as well as either sweetness or richness or both of sweetness and richness. Loaves of bread having these emulsified oil and fat compositions had undesirable fermentation smell, and were inferior in terms of richness and aroma.

<Production of Cookie>

Cookies were produced by the following method using the emulsified oil and fat compositions produced above. Dough was prepared by mixing the materials listed under the section "Composition" in Table 6 (unit: mass %), and allowed to rest in a refrigerator for a time. The dough was rolled out to a thickness of 1 cm, and cut into 2 cm×8 cm pieces, which were then placed on a baking sheet and baked at 160° C. for 17 minutes to obtain cookies. The resulting cookies were allowed to stand for 30 minutes for cooling down, and then sealed in a plastic bag, and stored at 25° C. for one week before subjected to the following sensory evaluation.

It is noted that an emulsified oil and fat composition similar to any one of the emulsified oil and fat compositions produced in the above <Production of emulsified oil and fat composition> was used each in this example. The types of emulsified oil and fat compositions used are shown in the parentheses at the lower portions of the section "Emulsified oil and fat composition" in Table 6. For example, in "Example 5-1", an emulsified oil and fat composition similar to that of "Example 1-2" was used.

<Sensory Evaluation of Cookies>

The resulting cookies were subjected to sensory evaluation by a panel of 20 people in accordance with the following criteria. The results are shown in the section "Evaluation" in Tables 6.

(Bran Smell of Cookies)

Very Good+ (indicated by bullseye symbol+ (☉+)): 17 or more among 20 persons did not sense bran smell.

Very Good (indicated by bullseye symbol (☉)): 13 or more and 16 or less among 20 persons did not sense bran smell.

Good (indicated by circle symbol (○)): 9 or more and 12 or less among 20 persons did not sense bran smell.

Fair (indicated by triangle symbol (Δ)): 5 or more and 8 or less among 20 persons did not sense bran smell.

Poor (indicated by cross symbol (x)): 4 or less among 20 persons did not sense bran smell.

(Collagen Smell of Cookies)

Very Good+ (indicated by bullseye symbol+ (☉+)): 17 or more among 20 persons did not sense collagen smell.

Very Good (indicated by bullseye symbol (☉)): 13 or more and 16 or less among 20 persons did not sense collagen smell.

Good (indicated by circle symbol (○)): 9 or more and 12 or less among 20 persons did not sense collagen smell.

Fair (indicated by triangle symbol (Δ)): 5 or more and 8 or less among 20 persons did not sense collagen smell.

Poor (indicated by cross symbol (x)): 4 or less among 20 persons did not sense collagen smell.

TABLE 6

| | | Example 5-1 | Example 5-2 | Example 5-3 | Example 5-4 | Example 5-5 | Comparative Example 6 | Comparative Example 7 | Comparative Example 8 |
|---|---|---|---|---|---|---|---|---|---|
| Composition | Weak wheat flour | 100 | 100 | 100 | 100 | 100 | 100 | 100 | 100 |
| | Granulated sugar | 70 | 70 | 70 | 70 | 70 | 70 | 70 | 70 |
| | Wheat bran | 5 | 5 | | 5 | 5 | 5 | 5 | 5 |
| | Collagen | | | 3 | | | | | |
| | Emulsified oil and fat composition | 50 (Example 1-2) | 50 (Example 1-5) | 50 (Example 1-5) | 50 (Example 2-6) | 50 (Example 3-6) | 50 (Comparative Example 1) | 50 (Comparative Example 4) | 50 (Comparative Example 5) |
| | Bran smell | ○ | ☉+ | — | ☉ | ☉+ | X | Δ | X |

TABLE 6-continued

| | Example 5-1 | Example 5-2 | Example 5-3 | Example 5-4 | Example 5-5 | Comparative Example 6 | Comparative Example 7 | Comparative Example 8 |
|---|---|---|---|---|---|---|---|---|
| Collagen smell | — | — | ◎₊ | — | — | — | — | — |

As shown in Table 6, for the cookies having the emulsified oil and fat compositions according to the present invention, undesirable bran and collagen smell from raw materials were suppressed.

In contrast, the cookies having the emulsified oil and fat compositions which did not satisfy the requirements of the present invention had undesirable bran smell.

The invention claimed is:

1. An emulsified oil and fat composition comprising a Koji amazake and having an aqueous phase at a pH of 3.1 or more and 6.0 or less.

2. The emulsified oil and fat composition according to claim 1, wherein the aqueous phase has a Brix value of 2 or more and 40 or less.

3. The emulsified oil and fat composition according to claim 1, wherein the emulsified oil and fat composition is a water-in-oil emulsified oil and fat composition.

4. The emulsified oil and fat composition according to claim 1, wherein an amount of Koji amazake is 0.3 to 16%.

5. The emulsified oil and fat composition according to claim 1, wherein the composition has an aqueous Brix value of 1.5 to 40.

6. The emulsified oil and fat composition according to claim 1, wherein the composition has an aqueous Brix value of 1.8 to 33.7.

7. The emulsified oil and fat composition according to claim 1, wherein the composition has a fat content of 70% or more.

8. The emulsified oil and fat composition according to claim 1, wherein the composition has a fat content of 80% or more.

9. The emulsified oil and fat composition according to claim 1, wherein the composition is a water-in-oil emulsion fat composition having plasticity.

10. The emulsified oil and fat composition according to claim 1, wherein the composition contains ester-exchanged oil from fractionated soft palm oil.

11. The emulsified oil and fat composition according to claim 1, wherein the composition contains palm oil.

12. The emulsified oil and fat composition according to claim 1, wherein the composition contains rapeseed oil.

13. The emulsified oil and fat composition according to claim 1, wherein the oil and fat is selected from the group consisting of soybean oil, rapeseed oil, corn oil, sesame oil, perilla (*Perilla frutescens* var. *crispa*) oil, linseed oil, peanut oil, safflower oil, high-oleic safflower oil, sunflower oil, high-oleic sunflower oil, cottonseed oil, grape seed oil, macadamia nut oil, hazelnut oil, pumpkin seed oil, walnut oil, camellia oil, tea seed oil, perilla (*Perilla frutescens*) oil, borage oil, olive oil, rice bran oil, wheat germ oil, coconut oil, cacao butter, palm oil, palm kernel oil, and algae oil.

14. The emulsified oil and fat composition according to claim 1, wherein the oil and fat is selected from the group consisting of soybean oil, rapeseed oil, corn oil, sesame oil, perilla (*Perilla frutescens* var. *crispa*) oil, linseed oil, peanut oil, safflower oil, high-oleic safflower oil, sunflower oil, high-oleic sunflower oil, cottonseed oil, grape seed oil, macadamia nut oil, hazelnut oil, pumpkin seed oil, walnut oil, camellia oil, tea seed oil, perilla (*Perilla frutescens*) oil, borage oil, olive oil, rice bran oil, and wheat germ oil.

15. A method for imparting refreshingness and sweetness to confectionery or baked goods comprising incorporating the oil and fat composition of claim 1 into the confectionary or baked goods, thereby imparting freshness and sweetness.

16. A method for manufacturing confectionery or baked goods comprising incorporating freshness and sweetness to confectionary or baked goods comprising incorporating the oil and fat composition of claim 1 into the confectionary or baked goods during the manufacturing process.

* * * * *